(12) United States Patent
Yabuta et al.

(10) Patent No.: US 10,811,973 B2
(45) Date of Patent: Oct. 20, 2020

(54) VEHICLE-MOUNTED DC-DC CONVERTER

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

(72) Inventors: Muneyoshi Yabuta, Mie (JP); Takeshi Hasegawa, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 42 days.

(21) Appl. No.: 16/297,832

(22) Filed: Mar. 11, 2019

(65) Prior Publication Data

US 2019/0280595 A1 Sep. 12, 2019

(30) Foreign Application Priority Data

Mar. 12, 2018 (JP) ................. 2018-044004

(51) Int. Cl.
*H02M 3/158* (2006.01)
*H02M 1/08* (2006.01)
(Continued)

(52) U.S. Cl.
CPC ........... *H02M 3/1582* (2013.01); *H02M 1/08* (2013.01); *H02M 3/157* (2013.01); *B60L 58/18* (2019.02);
(Continued)

(58) Field of Classification Search
CPC .. H02M 3/1582; H02M 3/157; H02M 3/1584; H02M 1/08; B60L 58/18
See application file for complete search history.

(56) References Cited

U.S. PATENT DOCUMENTS

| 2009/0243385 A1* | 10/2009 | Ichikawa | ............ | H02M 3/1582 |
| | | | | 307/9.1 |
| 2010/0207587 A1* | 8/2010 | Oyobe | .................. | H02J 7/0063 |
| | | | | 320/152 |

(Continued)

FOREIGN PATENT DOCUMENTS

JP 2012-227692 A 11/2012

*Primary Examiner* — Jeffrey M Shin
(74) *Attorney, Agent, or Firm* — Honigman LLP (57) ABSTRACT

When a calculated duty obtained through a feedback operation is within a specific range, a duty outside the specific range is adopted without increasing a difference from the operation result. When a calculated duty obtained through a feedback operation is within a modification target range, an arithmetic unit of a DC-DC converter selects a predetermined value as a substitute and determines a usage duty based on the substitute. Whenever the calculated duty within the modification target range is obtained, the arithmetic unit updates a cumulative value by accumulating a value indicating a difference between the usage duty based on the substitute and the calculated duty. When a predetermined condition is met, the arithmetic unit modifies the usage duty by performing addition or subtraction on a part or whole of the cumulative value, and updates the cumulative value by subtracting the value used for modifying the usage duty.

6 Claims, 4 Drawing Sheets

(51) Int. Cl.
*H02M 3/157* (2006.01)
*B60L 58/18* (2019.01)
*H02M 1/00* (2006.01)

(52) U.S. Cl.
CPC .. *B60L 2210/12* (2013.01); *H02M 2001/0009* (2013.01)

(56) References Cited

U.S. PATENT DOCUMENTS

2012/0326671 A1* 12/2012 Krause ................. H01M 10/44 320/126
2013/0110337 A1* 5/2013 Kondoh ................... H02J 7/34 701/22
2019/0305685 A1* 10/2019 Miki ..................... H02M 3/155

* cited by examiner

VEHICLE-MOUNTED DC-DC CONVERTER

CROSS-REFERENCE TO RELATED APPLICATIONS

This application claims priority of Japanese Patent Application No. JP2018-044004 filed Mar. 12, 2018, the contents of which are incorporated herein.

TECHNICAL FIELD

The present disclosure relates to a vehicle-mounted DC-DC converter.

BACKGROUND

Japanese Unexamined Patent Application Publication No. 2012-227692 ("JP '692") discloses an example of a PWM signal generation device. It is an object of this PWM signal generation device to use a simple circuit for doubling the resolution of a PWM signal and outputting the resulting signal, without doubling the frequency of a reference clock. To be more specific, the PWM signal generation device includes: a first PWM output control circuit that outputs the PWM signal in accordance with a rising clock edge of a clock signal; a second PWM output control circuit that outputs a PWM signal in accordance with a falling clock edge of the clock signal; and a switching circuit that switches the output between these control circuits.

JP '692 is an example of related art.

However, the PWM signal generation device disclosed in JP '692 is not intended to be a device for which a specific range longer than the cycle of the PWM signal is a duty unsettable range (such as a device for which the specific range is an inoperable range in which no duty is settable). Thus, the PWM signal generation device disclosed in JP '692 is incapable of performing appropriate processing when a duty calculated through a feedback operation is within the specific range (the duty unsettable range longer than the cycle of the PWM signal).

The present disclosure was conceived to solve at least one of the stated issues, and it is an object of the present disclosure to provide a device that has a configuration in which a duty within a specific range shorter than or equal to a cycle of a PWM signal is not used and that, when a calculated duty obtained through a feedback operation is within the specific range, can appropriately adopt a duty outside the specific range without increasing a difference from the result of the operation.

An example according to the present disclosure is a vehicle-mounted DC-DC converter that is electrically connected to a first conductive path and a second conductive path, one of which being an input-side conductive path and another of which being an output-side conductive path, performs one of a voltage step-up operation and a voltage step-down operation on a voltage applied to the input-side conductive path, and outputs a resulting voltage to the output-side conductive path. The vehicle-mounted DC-DC converter includes: a voltage conversion unit which includes a switching element that performs an on-off operation in response to a PWM signal, and which performs one of a voltage step-up operation and a voltage step-down operation on a voltage applied to the input-side conductive path through the on-off operation of the switching element and to output a resulting voltage to the output-side conductive path; a voltage detection unit which detects a voltage value of the output-side conductive path; an arithmetic unit which repeats a feedback operation to calculate a duty of the PWM signal based on at least the voltage value detected by the voltage detection unit so that the voltage value of the output-side conductive path approaches a target voltage value and, whenever the feedback operation is performed, determines a usage duty based on the calculated duty calculated through the feedback operation; and a drive unit which outputs, to the switching element, the PWM signal based on the usage duty determined by the arithmetic unit. When the calculated duty calculated through the feedback operation is within a modification target range in which the calculated duty is smaller than a predetermined upper limit value and larger than a predetermined lower limit value, the arithmetic unit selects one of the lower limit value and the upper limit value as a substitute, and determines the usage duty based on the substitute. When the calculated duty is outside the modification target range, the arithmetic unit determines the usage duty based on the calculated duty. Whenever the calculated duty within the modification target range is obtained, the arithmetic unit performs an accumulation process to update a cumulative value by accumulating a value corresponding to a difference between the usage duty determined based on the substitute and the calculated duty. When a predetermined condition is met, the arithmetic unit modifies the usage duty by performing one of addition and subtraction on one of a part and a whole of the cumulative value updated by the accumulation process performed most recently, and updates the cumulative value by subtracting a value corresponding to the one of the part and the whole that is used for modifying the usage duty.

When the calculated duty obtained through the feedback operation is within the modification target range (within the range in which the calculated duty is smaller than the predetermined upper limit value and larger than the predetermined lower limit value), the vehicle-mounted DC-DC converter described above can select the lower limit value or the upper limit value as the substitute and determine the usage duty based on the substitute. With this configuration, when there are circumstances in which the value within the modification target range is not used or is not usable as the duty, the value based on the substitute (the lower limit value or the upper limit value) instead of on the calculated duty can be used as the usage duty.

With this configuration, a "discrepancy" occurs between the usage duty based on the substitute and the calculated duty. However, whenever such a substitute is used, the accumulation process is performed to update the cumulative value by accumulating the value corresponding to the difference between the usage duty determined based on the substitute and the calculated duty. With this process, the "cumulative value" indicating the level of the accumulated "discrepancy" can be stored as quantitative information. Then, when the predetermined condition is met, the usage duty can be modified by performing addition or subtraction on a part or a whole of the cumulative value updated by the accumulation process performed most recently, and the cumulative value can be updated by subtracting a value corresponding to the part or the whole that is used for modifying the usage duty. With this, the accumulated "discrepancy" can be reflected in the usage duty, and the accumulated "discrepancy" can be reduced or eliminated.

To solve the issue in which a modification target range (the inoperable range) is present in which a duty within the specific range is not allowed to be set, a costly hardware configuration is typically used. According to the present disclosure, however, even if a cheaper hardware configuration that has an inoperable range is used, such circumstances can be solved. As a result, even with a cheaper hardware configuration that has an inoperable range, the duty range and fluctuations in the duty that has been unusable for the DC-DC converter can be averaged and expressed.

DETAILED DESCRIPTION OF PREFERRED EMBODIMENTS

Hereinafter, a preferred embodiment according to the disclosure is described. When the calculated duty is within the modification target range, the arithmetic unit may select the lower limit value as the usage duty. Whenever the calculated duty within the modification target range is obtained, the arithmetic unit may perform the accumulation process to update the cumulative value by accumulating a difference between the lower limit value and the calculated duty. When the cumulative value updated by the accumulation process reaches a fixed value, the arithmetic unit may modify the usage duty by adding the fixed value to the lower limit value and update the cumulative value by subtracting the fixed value.

With this configuration, when the calculated duty calculated through the feedback operation is within the modification target range, the lower limit value can be determined as the usage duty. With this, under circumstances in which the value within the modification target range is not used or is not usable and thus the lower limit value can be used as an actual duty, the lower limit value instead of the calculated duty can be substituted as the usage duty.

With this configuration, a "discrepancy" occurs between the lower limit value (the usage duty) and the calculated duty. However, whenever such a substitute is used, the accumulation process is performed to update the cumulative value by accumulating the difference between the lower limit value (the usage duty) and the calculated duty. With this process, the "cumulative value" indicating the level of the accumulated "discrepancy" can be stored as quantitative information. In addition, this information on the "cumulative value" accurately reflects the accumulated "discrepancy".

Then, when the cumulative value updated by the accumulation process reaches the fixed value, the usage duty can be modified by adding the fixed value, and the cumulative value can be updated by subtracting the fixed value. As a result, whenever the cumulative value reaches the fixed value, the accumulated "discrepancy" can be reduced or eliminated. This can prevent the accumulated "discrepancy" from significantly increasing. Moreover, by reducing or eliminating the accumulated "discrepancy", the value to be added can be prevented from significantly increasing, which in turn can prevent the modification made to the usage duty from significantly increasing (that is, prevent the difference from the result of a feedback operation from significantly increasing).

The fixed value may be a value obtained by subtracting the lower limit value from the upper limit value. When the cumulative value reaches the fixed value through the accumulation process performed after the calculated duty within the modification target range is obtained, the arithmetic unit may select the upper limit value as the usage duty and update the cumulative value by subtracting the fixed value.

With this configuration, whenever the calculated duty is within the modification target range, the lower limit value can be used as the usage duty. Moreover, whenever the cumulative value updated by the accumulation process reaches the fixed value (that is obtained by subtracting the lower limit value from the upper limit value), the upper limit value can be used as the usage duty. With this, when the cumulative value is smaller than the fixed value, the lower limit value can be used as the usage duty whenever the calculated duty is within the modification target range. Thus, within a range including a value smaller than the calculated duty and a value outside the modification target range, the value closes to the calculated duty (that is, the lower limit value) can be substituted as the usage duty. On the other hand, when the cumulative value updated by the accumulation process performed after the calculated duty is obtained reaches the fixed value, the value obtained by adding the calculated duty and the fixed value reaches or exceeds the upper limit value. In this case, the upper limit value can be substituted as the usage duty. With this, the value close to the calculated duty can be used as the usage duty and the accumulated "discrepancy" can be reduced or eliminated. As a result, even with a cheaper hardware configuration having the inoperable range, the duty range and fluctuations in the duty that has been unusable for the DC-DC converter can be averaged and expressed.

The upper limit value may be 100%, and the lower limit value may be a next largest value after 100% among duty candidates outputtable by the drive unit. When the calculated duty is within the modification target range, the arithmetic unit may determine, as the usage duty, the lower limit value or the upper limit value.

With this configuration, when the calculated duty is within the inoperable range near the upper limit value (the range between 100% and the next largest value after 100% among duty candidates outputtable by the drive unit), the lower limit value (the next largest value after 100% among the duty candidates outputtable by the drive unit) or the upper limit value (100%) can be determined as the usage duty. Thus, even if the inoperable range is present near the upper limit value and a calculated duty within the inoperable range is obtained through the feedback operation, the usable value (the upper limit value or the lower limit value) closer to the calculated duty can be substituted as the usage duty. Furthermore, the "discrepancy" at this time can be solved through an operation performed separately.

Embodiment 1

Hereinafter, Embodiment 1 embodying the present disclosure is described.

Figure 1:
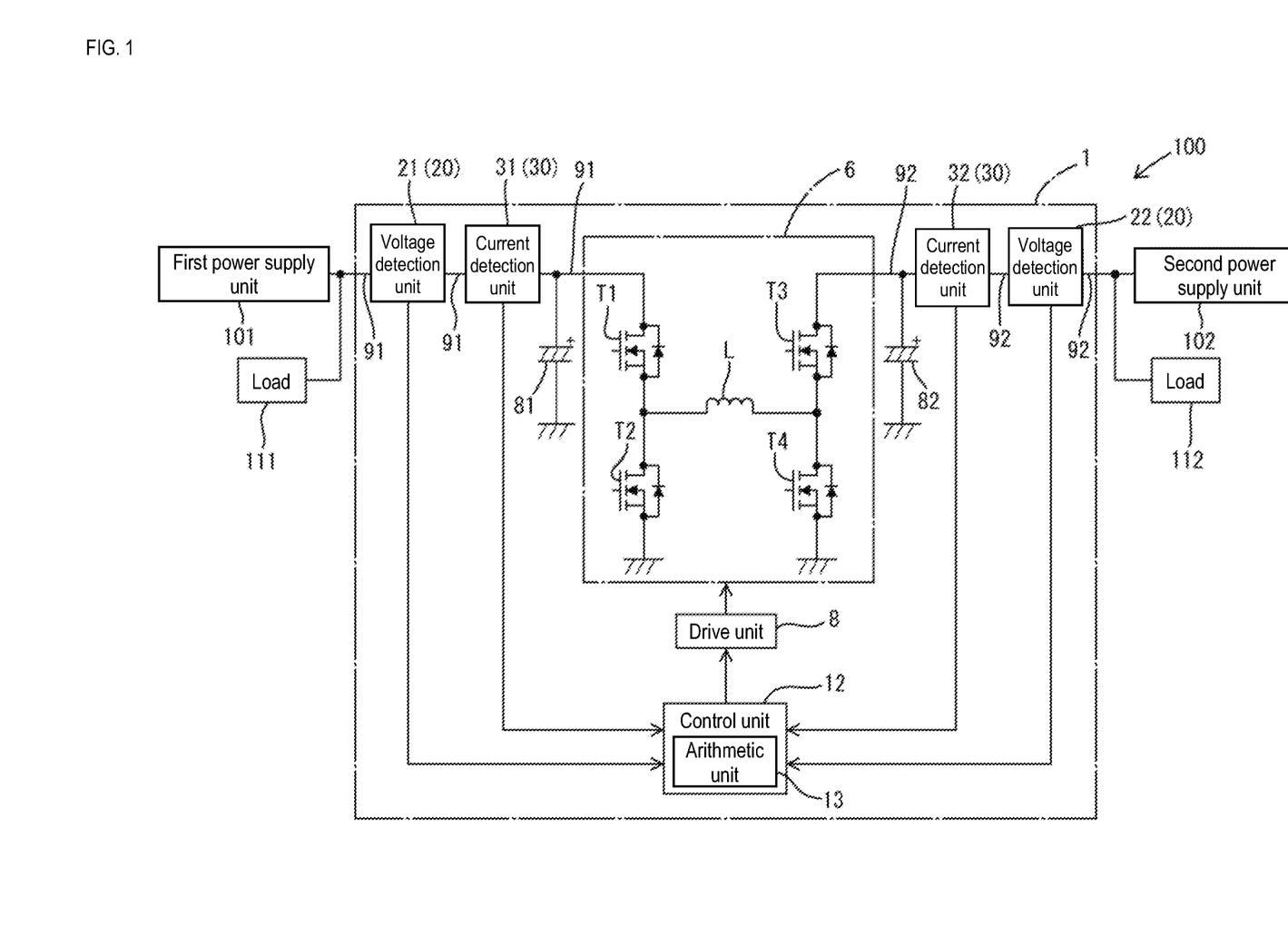
FIG. 1 is a schematic circuit diagram showing an example of a vehicle-mounted power supply system including a vehicle-mounted DC-DC converter according to Embodiment 1.

A vehicle-mounted power supply system 100 shown in FIG. 1 includes a vehicle-mounted DC-DC converter 1 (hereinafter, also referred to as the DC-DC converter 1), a first power supply unit 101, and a second power supply unit 102. The vehicle-mounted power supply system 100 is configured to supply electric power to vehicle-mounted loads such as loads 111 and 112.

The DC-DC converter 1 is configured as a vehicle-mounted step up-down DC-DC converter, for example. The DC-DC converter 1 steps up or down a direct-current voltage applied to one of a first conductive path 91 and a second conductive path 92, and then outputs the resulting voltage to the other of the first conductive path 91 and the second conductive path 92.

The DC-DC converter 1 includes the first conductive path 91 and the second conductive path 92 which are power lines. The first conductive path 91 is electrically connected to a high-potential terminal of the first power supply unit 101 provided as a high-voltage power supply unit, and is thus electrically continuous with this high-potential terminal. The first power supply unit 101 applies a predetermined direct-current voltage to the first conductive path 91. The second conductive path 92 is electrically connected to a high-potential terminal of the second power supply unit 102 provided as a low-voltage power supply unit, and is thus electrically continuous with this high-potential terminal. The second power supply unit 102 applies a predetermined direct-current voltage to the second conductive path 92.

Each of the first power supply unit 101 and the second power supply unit 102 includes a well-known power storage means, such as a lead storage battery, a lithium-ion battery, an electric double layer capacitor, a lithium-ion capacitor, or a different electric storage unit. An output voltage of the first power supply unit 101 is higher than an output voltage of the second power supply unit 102. These output voltages are not particularly limited to specific values. Respective low-potential terminals of the first power supply unit 101 and the second power supply unit 102 are electrically connected to a grounding unit (not shown) and kept at a predetermined ground potential (0 V).

The first conductive path 91 electrically connected to the first power supply unit 101 is electrically connected to the vehicle-mounted load 111. The vehicle-mounted load 111 is supplied with power from the first power supply unit 101. The second conductive path 92 electrically connected to the second power supply unit 102 is electrically connected to the vehicle-mounted load 112. The vehicle-mounted 112 is supplied with power from the second power supply unit 102. The vehicle-mounted loads 111 and 112 are well-known vehicle-mounted electrical components and not particularly limited in type.

A voltage conversion unit 6 has a function of stepping up or down a voltage input through on-off operations of switching elements T1, T2, T3, and T4, and outputting the resulting voltage. The voltage conversion unit 6 is disposed between the first conductive path 91 and the second conductive path 92, and has a step-up function of performing a voltage step-up operation and a step-down function of performing a voltage step-down operation. The following describes a case, as an example, where the voltage conversion unit 6 executes: the step-down function to step down the voltage applied to the first conductive path 91 and output the resulting voltage to the second conductive path 92; and the step-up function to step up the voltage applied to the second conductive path 92 and output the resulting voltage to the first conductive path 91.

The voltage conversion unit 6 includes the switching elements T1, T2, T3, and T4, which are arranged in an H-bridge configuration, and an inductor L. The voltage conversion unit 6 functions as a so-called bidirectional DC-DC converter. Each of the switching elements T1, T2, T3, and T4 is an N-channel MOSFET. The inductor L is a well-known coil. Here, the first conductive path 91 is electrically connected to one of the electrodes of a capacitor 81. The other electrode of the capacitor 81 is electrically connected to the ground. The second conductive path 92 is electrically connected to one of the electrodes of a capacitor 82. The other electrode of the capacitor 82 is electrically connected to the ground.

In the voltage conversion unit 6, a drain of the switching element T1 is electrically connected to the first conductive path 91, and a source of the switching element T1 is electrically connected to a drain of the switching element T2 and to one end of the inductor L. A drain of the switching element T3 is electrically connected to the second conductive path 92, and a source of the switching element T3 is electrically connected to a drain of the switching element T4 and to the other end of the inductor L. A source of the switching element T2 and a source of the switching element T4 are electrically connected to the ground. Signals from a drive unit 8 described later are input to respective gates of the switching elements T1, T2, T3, and T4.

A voltage detection unit 20 includes voltage detection units 21 and 22. Each of the voltage detection units 21 and 22 is a well-known voltage detection circuit. The voltage detection unit 21 inputs, to a control unit 12, a value indicating the voltage of the first conductive path 91 (such as the voltage value of the first conductive path 91 or a value of a divided voltage obtained by dividing the voltage value of the first conductive path 91 using a voltage division circuit) as a detected value. The voltage detection unit 22 inputs, to the control unit 12, a value indicating the voltage of the first conductive path 92 (such as the voltage value of the second conductive path 92 or a value of a divided voltage obtained by dividing the voltage value of the second conductive path 92 using a voltage division circuit) as a detected value. The control unit 12 identifies the voltage value of the first conductive path 91 on the basis of the value input from the voltage detection unit 21 (the detected value of the voltage detection unit 21). The control unit 12 identifies the voltage value of the second conductive path 92 on the basis of the value input from the voltage detection unit 22 (the detected value of the voltage detection unit 22).

A current detection unit 30 includes current detection units 31 and 32. Each of the current detection units 31 and 32 is a well-known current detection circuit. The current detection unit 31 is a current detection circuit that detects a current passing through the first conductive path 91. For example, the current detection unit 31 includes: a shunt resistor disposed in the first conductive path 91; and a differential amplifier that amplifies the voltage between both ends of the shunt resistor and outputs the amplified voltage. The current detection unit 32 is a current detection circuit that detects a current passing through the second conductive path 92. For example, the current detection unit 32 includes: a shunt resistor disposed in the second conductive path 92; and a differential amplifier that amplifies the voltage between both ends of the shunt resistor and outputs the amplified voltage. The control unit 12 identifies the value of the current passing through the first conductive path 91 on the basis of the value input from the current detection unit 31 (the detected value of the current detection unit 31). The control unit 12 identifies the value of the current passing through the second conductive path 92 on the basis of the value input from the current detection unit 32 (the detected value of the current detection unit 32).

The control unit 12 is, for example, a microcomputer, and includes a CPU, a ROM, a RAM, and a nonvolatile memory. The control unit 12 stores gain values used for a feedback operation, values for specifying a modification target range described later (such as a predetermined lower limit value and a predetermined upper limit value), a cumulative value described later, and so forth. The control unit 12 functions as an arithmetic unit 13. The arithmetic unit 13 may be implemented by a software process using an information processing device or as a hardware circuit. The arithmetic unit 13 performs feedback control using a well-known method, on the basis of the voltage values input from the voltage detection unit 20, the current values input from the current detection unit 30, and a target voltage value. With this, the arithmetic unit 13 sets a duty of the PWM signal to be provided to the voltage conversion unit 6. Then, the arithmetic unit 13 outputs the PWM signal based on the set duty to the drive unit 8. The target voltage value may be set by the arithmetic unit 13, or may be designated by an external device, such as an external ECU.

The drive unit 8 is a circuit that outputs control signals to turn on or off the switching elements T1, T2, T3, and T4. The drive unit 8 has a function of outputting, to the voltage conversion unit 6, the PWM signal based on the duty set by the control unit 12.

In a step-down mode, the control unit 12 and the drive unit 8 perform operations for synchronous rectification control to output PWM signals with dead time to the gates of the switching elements T1 and T2 in a complementary manner. To be more specific, the synchronous rectification control is performed as follows. While an ON signal (such as an H-level signal) is output to the switching element T1, an OFF signal (such as an L-level signal) is output to the switching element T2. While the ON signal (such as the H-level signal) is output to the switching element T2, the OFF signal (such as the L-level signal) is output to the switching element T1. With this control, an operation to step down the direct-current voltage (the input voltage) applied to the first conductive path 91 is performed, and thus an output voltage lower than the input voltage applied to the first conductive path 91 is applied to the second conductive path 92. The output voltage applied to the second conductive path 92 is determined according to the duty of the PWM signal provided to the gate of the switching element T1. Here, in the step-down mode, the ON signal is continuously input to the gate of the switching element T3, and thus the switching element T3 stays in an ON state. Moreover, the OFF signal is continuously input to the gate of the switching element T4, and thus the switching element T4 stays in an OFF state.

In the step-down mode, the control unit 12 performs feedback control according to a well-known method. To be more specific, the arithmetic unit 13 cyclically repeats feedback operations to calculate the duty of the PWM signal (the control signal) on the basis of the output voltage detected by the voltage detection unit 22 (the output voltage detection unit in the step-down mode) so that the voltage of the second conductive path 92 (the output-side conductive path in the step-down mode) approaches the target voltage value. Due to the feedback operation being executed cyclically, a well-known feedback operation process such as a PID operation or a PI operation is performed on the basis of a deviation between the output voltage value and the target voltage value, and a new duty is determined such that the output voltage value approaches the target voltage value. The control unit 12 continuously outputs the PWM signal (the control signal) in the step-down mode. Then, whenever the arithmetic unit 13 performs a feedback operation, the control unit 12 changes the duty of the PWM signal (the control signal) to a value corresponding to the new duty (the calculated duty) obtained through the feedback operation. The drive unit 8 obtains the PWM signal from the control unit 12 and outputs a PWM signal having the same cycle and the same duty as the obtained PWM signal to the gate of the switching element T1. The PWM signal output from the drive unit 8 to the gate of the switching element T1 is adjusted to an appropriate level such that the voltage of the ON signal (the H-level signal) can cause the switching element T1 to turn on. Then, the drive unit 8 outputs, to the gate of the switching element T2, a PWM signal complementary to the PWM signal output to the gate of the switching element T1, and performs the synchronous rectification control. The PWM signal output from the drive unit 8 to the gate of the switching element T2 is also adjusted to an appropriate level such that the voltage of the ON signal (the H-level signal) can cause the switching element T2 to turn on.

It should be noted that, in the step-down mode, the first conductive path 91 corresponds to an example of an input-side conductive path and the second conductive path 92 corresponds to an example of an output-side conductive path.

In a step-up mode, the control unit 12 and the drive unit 8 perform operations for synchronous rectification control to output PWM signals with dead time to the gates of the switching elements T1 and T2 in a complementary manner. To be more specific, the synchronous rectification control is performed as follows. While the ON signal (such as the H-level signal) is output to the switching element T2, the OFF signal (such as the L-level signal) is output to the switching element T1. While the ON signal (such as the H-level signal) is output to the switching element T1, the OFF signal (such as the L-level signal) is output to the switching element T2. With this control, an operation to step up the direct-current voltage (the input voltage) applied to the second conductive path 92 is performed, and thus an output voltage higher than the input voltage applied to the second conductive path 92 is applied to the first conductive path 91. The output voltage applied to the first conductive path 91 is determined according to the duty of the PWM signal provided to the gate of the switching element T2. Here, in the step-up mode, the ON signal is continuously input to the gate of the switching element T3, and thus the switching element T3 stays in the ON state. Moreover, the OFF signal is continuously input to the gate of the switching element T4, and thus the switching element T4 stays in the OFF state.

In the step-up mode, the control unit 12 performs feedback control according to a well-known method. To be more specific, the arithmetic unit 13 cyclically repeats a feedback operation to calculate the duty of the PWM signal (the control signal) on the basis of the output voltage detected by the voltage detection unit 21 (the output voltage detection unit in the step-up mode) so that the voltage of the first conductive path 91 (the output-side conductive path in the step-up mode) approaches the target voltage value. The feedback operation can be performed in the same manner as in the step-down mode. The control unit 12 continuously outputs the PWM signal (the control signal) in the step-up mode. Then, whenever the arithmetic unit 13 performs a feedback operation, the control unit 12 changes the duty of the PWM signal (the control signal) to a value corresponding to the new duty (the calculated duty) obtained through the feedback operation. The drive unit 8 obtains the PWM signal from the control unit 12 and outputs a PWM signal having the same cycle and the same duty as the obtained PWM signal to the gate of the switching element T2. The PWM signal output from the drive unit 8 to the gate of the switching element T2 is adjusted to an appropriate level such that the voltage of the ON signal (the H-level signal) can cause the switching element T2 to turn on. Then, the drive unit 8 outputs, to the gate of the switching element T1, a PWM signal complementary to the PWM signal output to the gate of the switching element T2, and performs the synchronous rectification control. The PWM signal output from the drive unit 8 to the gate of the switching element T1 is also adjusted to an appropriate level such that the voltage of the ON signal (the H-level signal) can cause the switching element T1 to turn on.

It should be noted that, in the step-up mode, the second conductive path 92 corresponds to an example of an input-side conductive path and the first conductive path 91 corresponds to an example of an output-side conductive path.

Next, feedback control performed by the arithmetic unit 13 is described. The arithmetic unit 13 determines a usage duty to be used in feedback control as follows. The feedback control described below can be performed in the same way both in the step-up mode and in the step-down mode.

Figure 2:
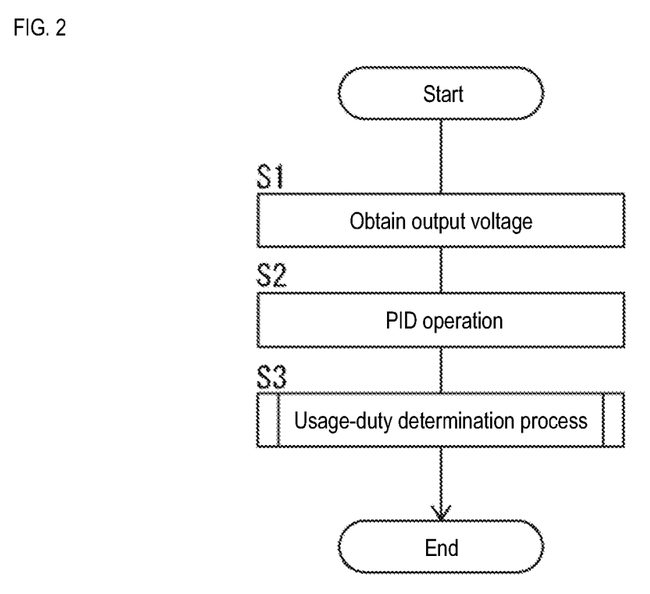
FIG. 2 is an exemplary flowchart of feedback control performed by the DC-DC converter according to Embodiment 1.

Specific feedback control performed by the arithmetic unit 13 is described, with reference to FIG. 2.

The feedback control shown in FIG. 2 is performed by the arithmetic unit 13. This process is performed for, for example, each cycle of the PWM signal. When a predetermined operation start condition is met, the arithmetic unit 13 performs this control according to the flowchart shown in FIG. 2. The operation start condition refers to when a starter switch (such as an ignition switch) of a vehicle is switched from off to on, for example. Here, the operation start condition is not limited to this.

Following the feedback control shown in FIG. 2 being started, the arithmetic unit 13 first obtains a detected value output from the voltage detection unit 20, and obtains an output voltage value Vout (S1). After step S1, the arithmetic unit 13 performs a feedback operation (such as a PID operation) on the basis of a deviation between the output voltage value Vout obtained in Step S1 and a target voltage value Vta, and calculates the calculated duty for bringing the output voltage value close to the target voltage value (S2). More specifically, the arithmetic unit 13 obtains the deviation between the output voltage value Vout obtained in Step S1 and the target voltage value Vta. Then, based on this deviation and gains (a proportional gain, a differential gain, and an integral gain), the arithmetic unit 13 calculates the control amount (the fluctuations in the duty) for bringing the output voltage value close to the target voltage value Vta according to a well-known PID arithmetic expression. Here, each of the proportional gain, the differential gain, and the integral gain may be a fixed value, or may be set according to a predetermined well-known method. After step S2, a usage-duty determination process is performed on the basis of the control amount (the fluctuations in the duty) calculated in step S2 (S3).

Figure 3:
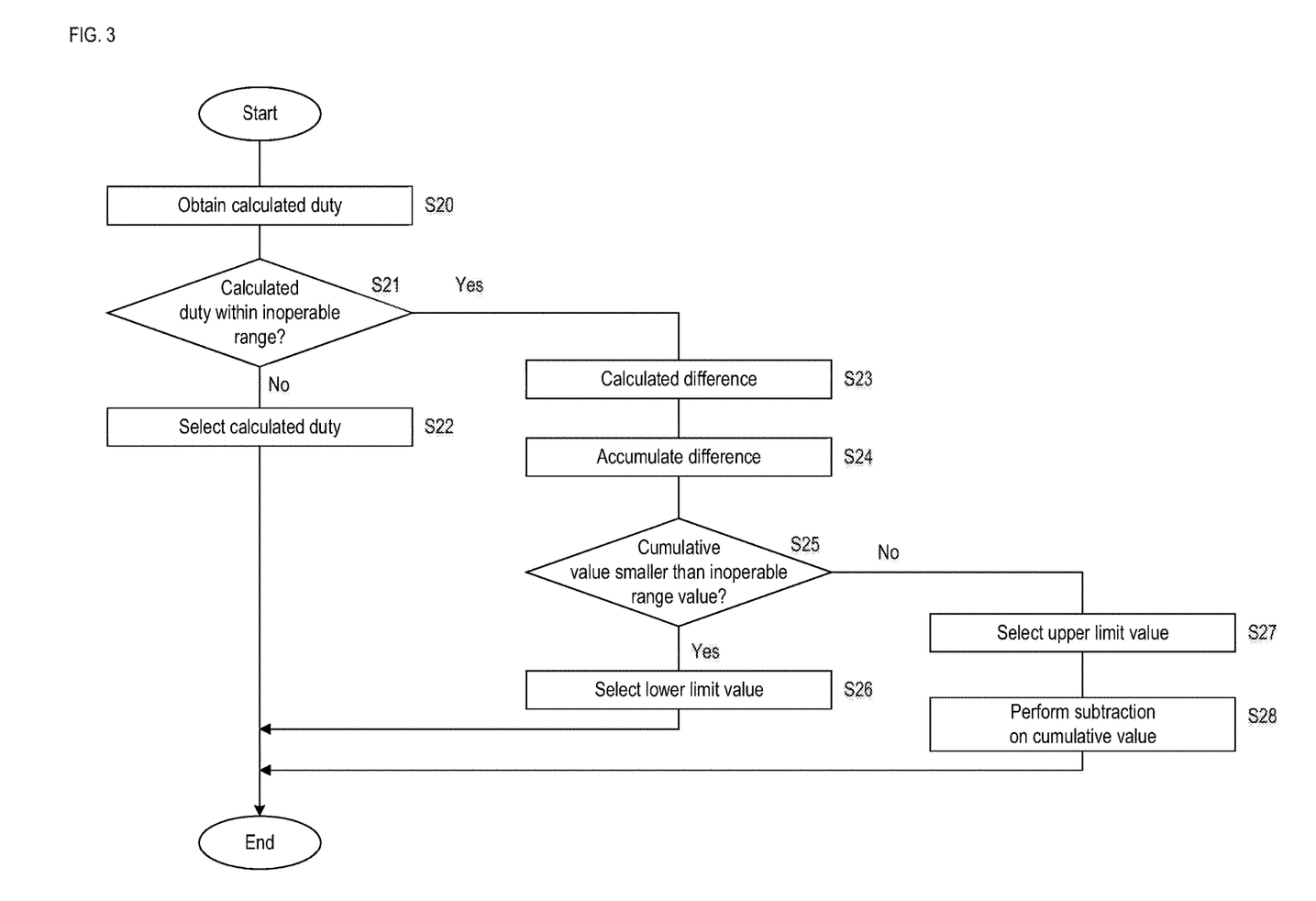
FIG. 3 is an exemplary flowchart of a duty determination process performed by an arithmetic unit included in the DC-DC converter according to Embodiment 1.

Next, the process in step S3 of FIG. 2 (the usage-duty determination process) is described with reference to FIG. 3 and FIG. 4. The arithmetic unit 13 performs the usage-duty determination process of step S3 according to the flowchart shown in FIG. 3, for example. After the usage-duty determination process has started, the arithmetic unit 13 obtains (calculates) the calculated duty in step S20. In this process of step S20, the duty (the calculated duty) to be set based on the control amount (the fluctuations in the duty) calculated in step S2 (see FIG. 2) is calculated. To be more specific, a control amount ΔD (the fluctuations in the duty) calculated in step S2 is added to a present duty value D1 to calculate a new duty D2 (a calculated duty) that is to be newly set. More specifically, the new duty D2 (the calculated duty) is calculated according to an expression of "D2=D1+ΔD".

With the present configuration, the arithmetic unit 13 cyclically repeats the feedback operation to calculate the duty of the PWM signal on the basis of the output voltage value detected by the voltage detection unit 22 (20) so that the voltage value of the output-side conductive path approaches the target voltage value. To be more specific, in this feedback operation, the control amount ΔD (the fluctuations in the duty) is determined through the PID operation performed using the deviation between the output voltage value and the target voltage value and the gains (the proportional gain, the differential gain, and the integral gain), and then the new duty D2 is calculated by adding the control amount ΔD to the present duty D1. Whenever the feedback operation is performed, the usage duty is determined on the basis of the calculated duty (the new duty D2) calculated through the feedback operation. The usage-duty determination method is described in detail as follows.

After step S20, the arithmetic unit 13 determines whether the calculated duty D2 obtained in step S20 is within a predetermined modification target range (an inoperable range) (S21). The modification target range (the inoperable range) refers to a range including a value larger than a predetermined lower limit value and a value smaller than a predetermined upper value, and is a partial range included in the range between 0% and 100%. It is predetermined that the drive unit 8 does not use any duty within this modification target range. The modification target range can be increased to be larger than the resolution of a duty that can be set within a range below the lower limit value. For the present configuration, the range within which no duty is settable because of constraints on the hardware configuration (such as constrains on operations of drive unit 8) is referred to as the modification target range (the inoperable range). More specifically, the modification target range (the inoperable range) is a range including a value smaller than the largest duty (100%, for example) that can be set by the drive unit 8 and a value larger than the next largest duty (97%, for example) that can be set by the drive unit 8 after the largest duty (100%, for example). In other words, among duty candidates that can be output by the drive unit 8, the largest value (100%) is the upper limit value and the next largest value after the largest value (100%) is the lower limit value. The control unit 12 is restricted in advance from outputting a PWM signal within this modification target range (the inoperable range). Here, the lower limit value and the upper limit value are stored in advance in a storage unit (not shown). In step S21, the arithmetic unit 13 determines whether the calculated duty obtained in step S20 is larger than the aforementioned lower limit value and smaller than the aforementioned upper limit value.

Suppose that, in step S21, the arithmetic unit 13 determines that the calculated duty is not within the modification target range (the inoperable range), that is, determines that the calculated duty is smaller than or equal to the lower limit value or is larger than or equal to the upper limit value ("N" in Step S21). In this case, the arithmetic unit 13 selects, as the usage duty, the calculated duty obtained in step S20, and outputs a PWM signal based on the calculated duty obtained in step S20 to the drive unit 8 (S22). Here, in the following cycle after the timing at which the feedback operation is performed, the PWM signal set for the calculated duty obtained through this feedback operation is output from the arithmetic unit 13 to the drive unit 8. Then, the PWM signal based on this duty is output from the drive unit 8. In this way, when the calculated duty is outside the modification target range, the arithmetic unit 13 determines the usage duty on the basis of the calculated duty.

For example, suppose that the lower limit value is fixed at 97% and that the upper limit value is fixed at 100%. Suppose also that the calculated duty is 97% through the feedback operation (or more specifically, the processes of steps S1, S2, and S20) performed in a cycle preceding a period "a" shown in FIG. 4. In this case, it is determined that the calculated duty is outside the modification target range (the inoperable range) in step S21, and thus the calculated duty of 97% is selected as the usage duty in step S22. As a result, in the cycle following this feedback operation (that is, the period "a" in FIG. 4), a PWM signal based on the duty of 97% is output from the control unit 12 and the drive unit 8. After ending the process of step S22, the arithmetic unit 13 ends the duty determination process (see FIG. 3) and performs control as shown in FIG. 2 again in a following cycle.

Suppose that the arithmetic unit 13 determines in step S21 that the calculated duty is within the modification target range (the inoperable range), that is, determines that the calculated duty obtained in step S20 is larger than the lower limit value and smaller than the upper limit value ("Y" in Step S21). In this case, in step S23, the arithmetic unit 13 calculates a difference between the lower limit value and the calculated duty obtained in step S20. Then, the arithmetic unit 13 performs a process (an accumulation process) of updating a present cumulative value by adding the difference value calculated in step S23 to the present cumulative value (S24). A cumulative value is obtained whenever the difference calculation process of step S23 is performed. The cumulative value is calculated by adding, to an initial value at a predetermined reference timing, a discrepancy (the difference between the lower limit value and the calculated duty obtained in Step S20) calculated using the difference calculation process. Here, note that whenever a reflection process is performed to reflect a part of the cumulative value in the usage duty, an adjustment is made by subtracting the amount of reflection in the reflection process from the cumulative value. The predetermined reference timing refers to the start-up of the DC-DC converter 1 (when use of the DC-DC converter 1 is started), or a timing at which the reflection process is performed. When the reference timing is the start-up of the DC-DC converter 1, the initial value of the cumulative value at this reference timing can be set to 0. When the reference timing is the timing of the reflection process, the value obtained by performing subtraction in the reflection process can be set as the initial value of the cumulative value at this reference timing.

After step S24, the arithmetic unit 13 determines whether the present cumulative value is smaller than a fixed value (the inoperable range) (S25). The fixed value (the inoperable range) is obtained by subtracting the aforementioned lower limit value from the aforementioned upper limit value. For example, when the upper limit value is 100% and the lower limit value is 97%, the fixed value (the inoperable range) is "3". If it is determined in step S25 that the cumulative value is smaller than the fixed value (the inoperable range), the arithmetic unit 13 selects the lower limit value as the usage duty (S26). On the other hand, if it is determined in step S25 that the cumulative value is larger than or equal to the fixed value (the inoperable range), the arithmetic unit 13 selects the upper limit value as the usage duty (S27). Then, the arithmetic unit 13 performs a subtraction process to subtract the fixed value from the present cumulative value (immediately before Step S28) to update the cumulative value (S28). After step S26 or S28 has ended, the arithmetic unit 13 ends the duty determination process (see FIG. 3) and performs control as shown in FIG. 2 again in the following cycle.

Figure 4:
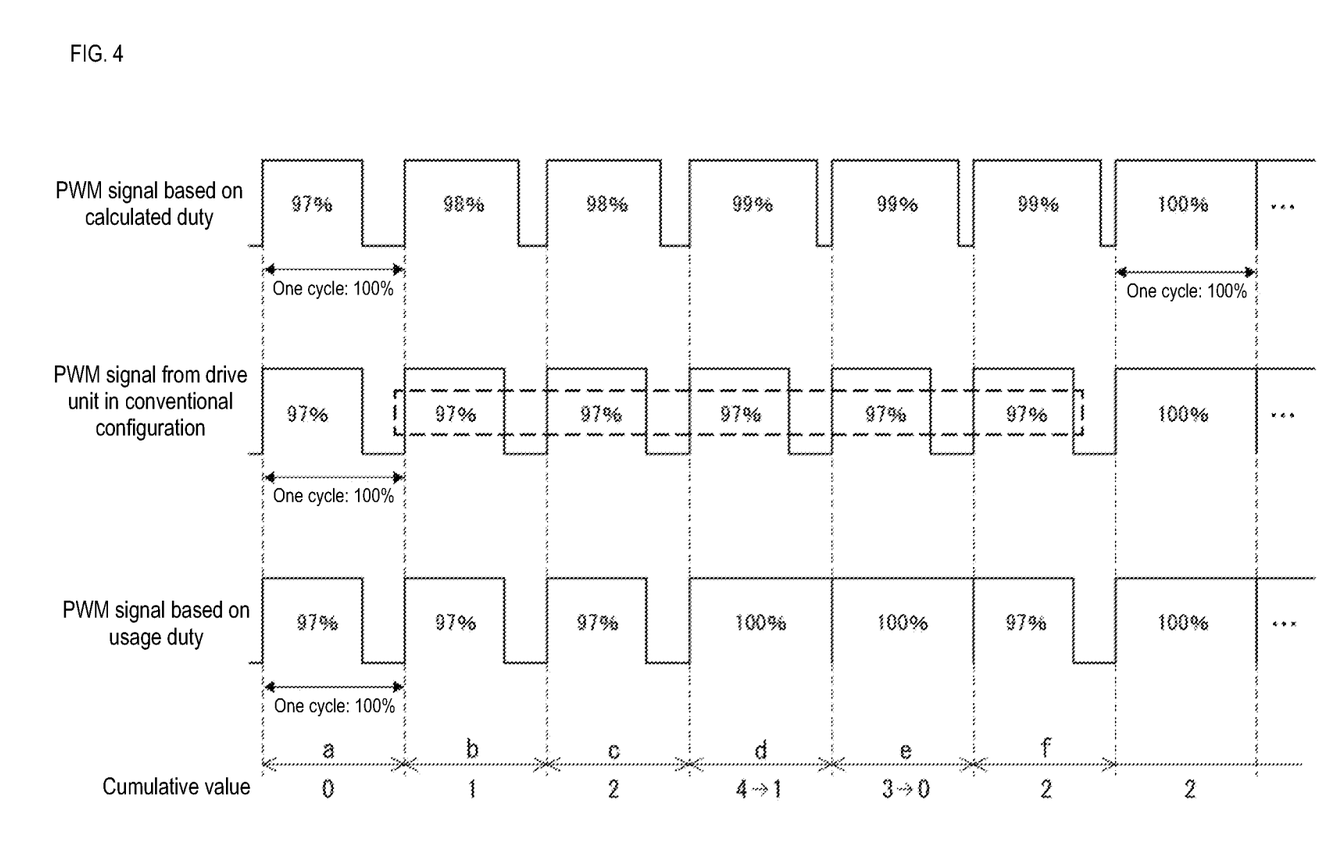
FIG. 4 is a diagram comparing an output waveform of a PWM signal output from a drive unit included in a conventional DC-DC converter and an output waveform of a PWM signal output from a drive unit included in the DC-DC converter according to Embodiment 1.

For example, suppose that the period "a" shown in the example of FIG. 4 is the reference timing since the cumulative value in this period is 0. When the calculated duty is 98% as per the usage-duty determination process performed in the period "a", a difference of "1" between the lower limit value (97%) and the calculated duty (98%) is added. As a result, the cumulative value is updated to "1" in step S24, and then the lower limit value (97%) is set as the usage duty in step S26. In a subsequent period "b", the PWM signal having the lower limit value (97%) as the usage duty is thus output and the cumulative value is updated to "1". Similarly, when the calculated duty is 98% as per the usage-duty determination process performed in the period "b", the difference of "1" between the lower limit value (97%) and the calculated duty (98%) is added. Thus, the cumulative value is updated to "2" in step S24, and then the lower limit value (97%) is set as the usage duty in step S26. In the subsequent period "c", a PWM signal having the lower limit value (97%) as the usage duty is thus output and the cumulative value is updated to "2".

On the other hand, when the calculated duty is 99% as per the usage-duty determination process performed in the period "c" shown in FIG. 4, the difference of "2" between the lower limit value (97%) and the calculated duty (99%) is added. Thus, the cumulative value is updated to "4" in step S24, and then the upper limit value (100%) is set as the usage duty in step S27. In step S28, the subtraction process is performed to subtract the fixed value "3" from the cumulative value "4", so that the cumulative value is updated to "1". In a subsequent period "d", a PWM signal having the upper limit value (100%) as the usage duty is thus output and the cumulative value is updated to "1". Moreover, when the calculated duty is 99% as per the usage-duty determination process performed in the period "d" shown in FIG. 4, the difference of "2" between the lower limit value (97%) and the calculated duty (99%) is added. Thus, the cumulative value is updated to "3" in step S24, and then the upper limit value (100%) is set as the usage duty in step S27. In step S28, the subtraction process is performed to subtract the fixed value "3" from the cumulative value "3", so that the cumulative value is updated to "0". In the subsequent period "e", the PWM signal having the upper limit value (100%) as the usage duty is thus output and the cumulative value is updated to "0".

Next, exemplary advantageous effects according to the present disclosure are described.

When the calculated duty calculated through the feedback operation is within the modification target range (within the range in which the calculated duty is smaller than the predetermined upper limit value and larger than the predetermined lower limit value), the DC-DC converter 1 described above can select the lower limit value or the upper limit value (the lower limit value in the typical example described above) as the substitute and determine the usage duty based on the substitute. With this configuration, under circumstances in which the value within the modification target range is not used or cannot be used as the duty, a value based on the substitute instead of on the calculated duty can be used as the usage duty.

With this configuration, a "discrepancy" occurs between the usage duty based on the substitute and the calculated duty. However, whenever such a substitute is used, the accumulation process is performed to update the cumulative value by accumulating the value corresponding to the difference between the usage duty determined based on the substitute and the calculated duty. With this process, the "cumulative value" indicating the level of the accumulated "discrepancy" can be stored as quantitative information. Then, when the predetermined condition is met, the usage duty can be modified by performing addition or subtraction on a part or a whole of the cumulative value updated by the accumulation process performed most recently, and the cumulative value can be updated by subtracting a value corresponding to the part or the whole that is used for modifying the usage duty. With this, the accumulated "discrepancy" can be reflected in the usage duty, and the accumulated "discrepancy" can be reduced or eliminated.

To be more specific, when the calculated duty is within the modification target range, the arithmetic unit 13 selects the lower limit value as the usage duty. Whenever a calculated duty within the modification target range is obtained, the arithmetic unit 13 performs the accumulation process to update the cumulative value by accumulating a difference between the lower limit value and the calculated duty. When the cumulative value updated by the accumulation process reaches a fixed value, the arithmetic unit 13 modifies the usage duty by adding the fixed value to the lower limit value and updates the cumulative value by subtracting the fixed value. With this configuration, when the calculated duty calculated through the feedback operation is within the modification target range, the lower limit value can be determined as the usage duty. Thus, under circumstances in which the value within the modification target range is not used or cannot be used and thus the lower limit value is usable as an actual duty, the lower limit value instead of the calculated duty can be substituted as the usage duty. With this configuration, a "discrepancy" occurs between the lower limit value (the usage duty) and the calculated duty. However, whenever such a substitute is used, the accumulation process is performed to update the cumulative value by accumulating the difference between the lower limit value (the usage duty) and the calculated duty. With this process, the "cumulative value" indicating the level of the accumulated "discrepancy" can be stored as quantitative information. In addition, this information regarding the "cumulative value" accurately reflects the accumulated "discrepancy". Then, when the cumulative value updated by the accumulation process reaches the fixed value, the usage duty can be modified by adding the fixed value and the cumulative value can be updated by subtracting the fixed value. As a result, whenever the cumulative value reaches the fixed value, the accumulated "discrepancy" can be reduced or eliminated. This can prevent the accumulated "discrepancy" from significantly increasing. Moreover, by reducing or eliminating the accumulated "discrepancy", the value to be added can be prevented from significantly increasing, which in turn can prevent the modification made to the usage duty from significantly increasing (that is, prevent the difference from the result of the feedback operation from significantly increasing).

To be more specific, the fixed value is obtained by subtracting the lower limit value from the upper limit value. When the cumulative value reaches the fixed value through the accumulation process performed after the calculated duty within the modification target range is obtained, the arithmetic unit 13 selects the upper limit value as the usage duty and updates the cumulative value by subtracting the fixed value. With this configuration, whenever the calculated duty is within the modification target range, the lower limit value can be used as the usage duty. Moreover, whenever the cumulative value updated by the accumulation process reaches the fixed value (that is obtained by subtracting the lower limit value from the upper limit value), the upper limit value can be used as the usage duty. With this, when the cumulative value is smaller than the fixed value, the lower limit value can be used as the usage duty whenever the calculated duty is within the modification target range. Thus, within a range including a value smaller than the calculated duty and a value outside the modification target range, the value closest to the calculated duty (that is, the lower limit value) can be substituted as the usage duty. On the other hand, when the cumulative value updated by the accumulation process performed after the calculated duty is obtained reaches the fixed value, the value obtained by adding the calculated duty to the fixed value reaches or exceeds the upper limit value. In this case, the upper limit value can be substituted as the usage duty. With this, the value close to the calculated duty can be used as the usage duty and the accumulated "discrepancy" can be reduced or eliminated.

In the present configuration, the upper limit value is 100%. The lower limit value is the next largest value after 100% among duty candidates outputtable by the drive unit 8. When the calculated duty is within the modification target range, the arithmetic unit 13 selects the lower limit value as the usage duty. With this configuration, when the calculated duty is within the inoperable range near the upper limit value (the range between 100% and the next largest value after 100% among duty candidates outputtable by the drive unit), the lower limit value (the next largest value after 100% among the duty candidates outputtable by the drive unit) can be determined as the usage duty. Thus, even if the inoperable range is present near the upper limit value and the calculated duty within the inoperable range is obtained through the feedback operation, the usable value (the lower limit value) close to the calculated duty can be substituted as the usage duty. Furthermore, the "discrepancy" that occurs at this time can be solved through an operation performed separately.

With the configuration described above, the PWM signal having a duty smaller than 100% and larger than the lower limit value (97%, for example) (that is, the PWM signal having the duty of 98%) and the PWM signal having the duty of 100% are not output in a row. This can prevent a case from occurring where the successive output of such signals causes an off-period of the PWM signal to fall below the fixed value (the difference between the upper limit value and the lower limit value). This advantageous effect is useful in the case where, when shifting from the on-period to the off-period, the PWM signal needs to have an off-period of a length corresponding to the aforementioned modification target range (the inoperable range). Moreover, this advantageous effect is also useful in the case where, when shifting from the off-period to the on-period, the PWM signal needs to have an off-period of a length corresponding to the aforementioned modification target range (the inoperable range).

In the middle part of FIG. 4, an exemplary waveform of a conventional DC-DC converter (a device that does not perform the process shown in FIG. 3) is shown. In a DC-DC converter, there are typically constraints on operations of a drive unit. Under such circumstances, a duty within a certain range near 100% cannot be set. For example, suppose that the inoperable range is a range including a value larger than 97% and a value smaller than 100% and that a duty within this inoperable range cannot be adopted. With this configuration, when a duty within the inoperable range is calculated through a feedback operation, a usable duty outside the inoperable range needs to be selected. Thus, even if the calculated duty of 98% is obtained in the period "a" in FIG. 4, a duty outside the inoperable range (97% in this case) is adopted as in the period "b" in the middle waveform of FIG. 4. This method disadvantageously results in an output that does not appropriately reflect the feedback operation. Moreover, fluctuations in the duty near the inoperable range are more likely to be intermittent, which may cause an inrush current due to a rapid change in the output voltage value.

On the other hand, when the calculated duty within the modification target range (the inoperable range) is obtained in the present configuration, the lower limit value is substituted as the usage duty and, in addition, the difference between the calculated duty and the lower limit value (the usage duty) is accumulated. The cumulative value is reflected ex-post facto when the value is accumulated to a certain level. With this, even if the calculated duty within the modification target range (the inoperable range) is obtained, a duty outside the modification target range can be adopted while appropriately reflecting the feedback operation. Moreover, the duties can be easily averaged. As a result, a continuous output voltage can be achieved.

Other Embodiments

The present disclosure is not limited to the embodiment according to the above description presented with reference to the drawings. For example, the following embodiments are also included in the technical scope according to the present disclosure. Moreover, the various features in the embodiments described above and below may be freely combined unless such combined features are inconsistent with one another.

In Embodiment 1, the arithmetic unit 13 selects the calculated duty obtained in step S20 without any change, as the usage duty for the PWM signal to be output to the drive unit 8 in step S22. However, the arithmetic unit 13 may select a value obtained by correcting the calculated duty of step S20 according to a predetermined correction formula.

In Embodiment 1, the arithmetic unit 13 selects the lower limit value as the usage duty in step S26. However, the arithmetic unit 13 may select the upper limit value as the usage duty, or may select a value obtained by correcting the lower limit value or the upper limit value according to a predetermined correction formula. For example, when the calculated duty is within the modification target range, the arithmetic unit may determine the upper limit value as the usage duty. Then, whenever the calculated duty within the modification target range is obtained, the arithmetic unit may perform the accumulation process to update the cumulative value by adding a difference between the upper limit value and the calculated duty. In this case, when the cumulative value updated by the accumulation process reaches a fixed value, the usage duty may be modified by subtracting the fixed value and also the cumulative value may be updated by subtracting the fixed value. To be more specific, the fixed value may be a value obtained by subtracting the lower limit value from the upper limit value. Then, when the cumulative value reaches the fixed value through the accumulation process performed after the calculated duty within the modification target range is obtained, the lower limit value may be determined as the usage duty and the cumulative value may be updated by subtracting the fixed value.

In Embodiment 1, the arithmetic unit 13 updates, in step S24, the cumulative value by adding the difference between the lower limit value and the calculated duty obtained in step S20. However, the arithmetic unit 13 may update the cumulative value by adding a value obtained by correcting the difference according to a predetermined correction formula.

Embodiment 1 describes an exemplary case as shown in FIG. 4 where the arithmetic unit 13 performs specific feedback control when the off-period of the PWM signal is nearly 100% of one cycle (the case where the output for one cycle switches from the on-period to the off-period). However, the arithmetic unit 13 may perform feedback control in the case where the off-period of the PWM signal is almost 0% (the case where the output for one cycle switches from the off-period to the on-period).

In Embodiment 1, the arithmetic unit 13 obtains the calculated duty through a feedback operation according to the PID control method in step S2. However, the arithmetic unit 13 may use the PI control method.

In Embodiment 1, the bidirectional step up-down DC-DC converter is described as an example of a DC-DC converter. However, a step-down DC-DC converter, a step-up DC-DC converter, or a step up-down DC-DC converter may be used. Moreover, a bidirectional DC-DC converter that can switch between the input side and the output side as in Embodiment 1 may be used. Alternatively, a unidirectional DC-DC converter fixed to the input side or the output side may be used.

In Embodiment 1, the single-phase DC-DC converter is described as an example. However, a multiphase DC-DC converter may be used.

In Embodiment 1, the synchronous rectification DC-DC converter is described as an example. However, a diode DC-DC converter in which some of switching elements are replaced with diodes may be used.

In Embodiment 1, the switching elements T1, T2, T3, and T4 that are the N-channel MOSFETs are described as examples of the switching elements included in the DC-DC converter. However, each of the switching elements may be a P-channel MOSFET, or a different type of switching element such as a bipolar transistor.

In Embodiment 1, the control unit 12 includes the microcomputer as the main constituent. However, the control unit 12 may be implemented by a plurality of hardware circuits instead of the microcomputer.

Embodiment 1 describes an exemplary case where feedback control is performed for each cycle of the PWM signal. However, the feedback control may be performed for each set of cycles of the PWM signal.

What is claimed is:

1. A vehicle-mounted DC-DC converter that is electrically connected to a first conductive path and a second conductive path, one of which being an input-side conductive path and another of which being an output-side conductive path, performs one of a voltage step-up operation and a voltage step-down operation on a voltage applied to the input-side conductive path, and outputs a resulting voltage to the output-side conductive path, the vehicle-mounted DC-DC converter comprising:

a voltage conversion unit including a switching element that performs an on-off operation in response to a PWM signal, and configured to perform one of a voltage step-up operation and a voltage step-down operation on a voltage applied to the input-side conductive path through the on-off operation of the switching element and to output a resulting voltage to the output-side conductive path;

a voltage detection unit configured to detect a voltage value of the output-side conductive path;

an arithmetic unit configured to repeat a feedback operation to calculate a duty of the PWM signal based on at least the voltage value detected by the voltage detection unit so that the voltage value of the output-side conductive path approaches a target voltage value and, whenever the feedback operation is performed, determine a usage duty based on the calculated duty calculated through the feedback operation; and a drive unit configured to output, to the switching element, the PWM signal based on the usage duty determined by the arithmetic unit, wherein the arithmetic unit is configured to:

when the calculated duty calculated through the feedback operation is within a modification target range in which the calculated duty is smaller than a predetermined upper limit value and larger than a predetermined lower limit value, select one of the lower limit value and the upper limit value as a substitute, and determine the usage duty based on the substitute;

when the calculated duty is outside the modification target range, determine the usage duty based on the calculated duty;

whenever the calculated duty within the modification target range is obtained, perform an accumulation process to update a cumulative value by accumulating a value corresponding to a difference between the usage duty determined based on the substitute and the calculated duty; and when a predetermined condition is met, modify the usage duty by performing one of addition and subtraction on one of a part and a whole of the cumulative value updated by the accumulation process performed most recently, and update the cumulative value by subtracting a value corresponding to the one of the part and the whole that is used for modifying the usage duty.

2. The vehicle-mounted DC-DC converter according to claim 1, wherein the arithmetic unit is configured to:

when the calculated duty is within the modification target range, select the lower limit value as the usage duty;

whenever the calculated duty within the modification target range is obtained, perform the accumulation process to update the cumulative value by accumulating a difference between the lower limit value and the calculated duty; and when the cumulative value updated by the accumulation process reaches a fixed value, modify the usage duty by adding the fixed value to the lower limit value and update the cumulative value by subtracting the fixed value.

3. The vehicle-mounted DC-DC converter according to claim 2, wherein the fixed value is obtained by subtracting the lower limit value from the upper limit value, and when the cumulative value reaches the fixed value through the accumulation process performed after the calculated duty within the modification target range is obtained, the upper limit value is determined as the usage duty and the cumulative value is updated by subtracting the fixed value.

4. The vehicle-mounted DC-DC converter according to claim 1, wherein the upper limit value is 100%, and the lower limit value is a next largest value after 100% among duty candidates outputtable by the drive unit, and the arithmetic unit is configured to determine, as the usage duty, one of the lower limit value and the upper limit value when the calculated duty is within the modification target range.

5. The vehicle-mounted DC-DC converter according to claim 2, wherein the upper limit value is 100%, and the lower limit value is a next largest value after 100% among duty candidates outputtable by the drive unit, and the arithmetic unit is configured to determine, as the usage duty, one of the lower limit value and the upper limit value when the calculated duty is within the modification target range.

6. The vehicle-mounted DC-DC converter according to claim 3, wherein the upper limit value is 100%, and the lower limit value is a next largest value after 100% among duty candidates outputtable by the drive unit, and the arithmetic unit is configured to determine, as the usage duty, one of the lower limit value and the upper limit value when the calculated duty is within the modification target range.

* * * * *